US006636803B1

(12) United States Patent
Hartz, Jr. et al.

(10) Patent No.: US 6,636,803 B1
(45) Date of Patent: Oct. 21, 2003

(54) REAL-ESTATE INFORMATION SEARCH AND RETRIEVAL SYSTEM

(75) Inventors: Daniel K. Hartz, Jr., Fairfax, VA (US); Michael T. Gorman, Arlington, VA (US); Eric Rossum, Annandale, VA (US); Richard Barney, Gaithersburg, MD (US)

(73) Assignee: Corus Home Realty, McLean, VA (US)

( * ) Notice: Subject to any disclaimer, the term of this patent is extended or adjusted under 35 U.S.C. 154(b) by 0 days.

(21) Appl. No.: 09/996,744

(22) Filed: Nov. 30, 2001

(51) Int. Cl.[7] .................................................. G06F 7/00
(52) U.S. Cl. ............................ 701/208; 705/1; 705/10
(58) Field of Search .................................. 701/200, 208, 701/213, 300; 340/990, 995; 705/1, 10, 27

(56) References Cited

U.S. PATENT DOCUMENTS

| | | | | |
|---|---|---|---|---|
| 5,844,570 | A | 12/1998 | Curtright et al. | ............ 345/629 |
| 5,884,216 | A | 3/1999 | Shah et al. | .................. 701/207 |
| 6,181,867 | B1 | 1/2001 | Kenner et al. | ................ 386/46 |
| 6,256,582 | B1 | 7/2001 | Helmstadter et al. | ....... 701/211 |
| 6,321,158 | B1 | 11/2001 | DeLorme et al. | ........... 701/201 |
| 6,323,885 | B1 * | 11/2001 | Wiese | ......................... 345/835 |
| 6,385,541 | B1 * | 5/2002 | Blumberg et al. | .......... 701/213 |
| 6,397,208 | B1 * | 5/2002 | Lee | ............................... 707/3 |

* cited by examiner

Primary Examiner—William A. Cuchlinski, Jr.
Assistant Examiner—Edward Pipala
(74) Attorney, Agent, or Firm—Miles & Stockbridge P.C.; Edward J. Kondracki

(57) ABSTRACT

A search and retrieval system includes a data terminal which displays icons representing properties in a given real-estate market on a digital map. The icons are selectable so that, when selected, information derived from an MLS or other database are displayed in association with the map. In one embodiment, the data terminal is equipped with a GPS receiver and data-enabled mobile phone. The GPS receiver receives location data which is used by a processor to display an icon representing a current location of the terminal within the map. The data-enabled phone links the terminal to a remote server or database of property information, which may also be displayed when property icons are selected on the map. The property information may include media (e.g., bitmap) data that provide a visual depiction of the property icons selected. By integrating all of these digital sources of information on one terminal, the efficiency and accuracy of the property buying experience is significantly enhanced.

33 Claims, 5 Drawing Sheets

REAL-ESTATE INFORMATION SEARCH AND RETRIEVAL SYSTEM

BACKGROUND OF THE INVENTION

1. Field of the Invention

This invention generally relates to information search and retrieval systems, and more particularly to a system and method for locating property in connection with a real-estate transaction. The invention also relates to an interactive data terminal which provides information for guiding buyers on a tour of property in a real-estate market, and which simultaneously retrieves and displays in an integrated form listing, media, and other data relating to properties included on the tour.

2. Description of the Related Art

Buying a home is one of the most important experiences in a person's life, and one of the most expensive. The home a person buys ultimately depends on the quantity and quality of information he or she is able to obtain about the market place prior to purchase. Locating this information for the buyer is the job of the real estate agent.

The techniques real estate agents currently use are antiquated and largely ineffective. A typical scenario involves assigning a buyer to an agent who has at least a working knowledge of a particular area of the market. During an initial consultation, the buyer gives the agent an idea of property he or she would like to buy or rent and a general idea of where that property should be located. Based on this information, the agent searches the Multiple Listing Service (MLS) database to locate properties that are currently available. A second meeting is then set up with the buyer for the purpose of visiting those properties.

During the second meeting, the agent must figure out exactly where the properties are located. A route must then be plotted for visiting those properties. This is usually done using paper maps and print-outs of MLS listings, which the agent often carries within him in the car. The use of paper maps and MLS listings has proven to be time-consuming, cumbersome, and generally inefficient.

Another drawback of current techniques relates to the need to physically visit properties with the market. Once the agent knows the general area of interest to the buyer, he usually escorts the buyer to each of the properties. Many times, however, the buyer does not even enter the properties because he can tell from just their outward appearance that they are unsuitable. The need to physically visit each and every property in a market to determine whether they are suitable wastes the buyer's and agent's time and, further, adds to the inefficiency of the home-buying experience.

Undoubtedly, there is a need for the real-estate industry to embrace new technologies in meeting buyers' needs. The industry has admittedly done a poor job doing so. Today, nearly two-thirds of all real estate brokers do not have a web presence, and nearly one third do not even use e-mail in their jobs. While this trend is slowly changing, the underlying process remains substantially the same. In the vast majority of cases, real-estate agents still rely on paper resources to develop property tours for buyers and are still required to chauffeur customers to physical property sites.

In view of the foregoing considerations, it is clear that there is a need for an improved system and method for developing property information that can be used by real-estate agents in assisting their customer needs.

SUMMARY OF THE INVENTION

It is one objective of the present invention to provide a system and method which increases the efficiency of the home-buying experience from both the agent's and buyer's perspective.

It is another objective of the present invention to achieve the aforementioned object by using digital technology to substantially reduce or altogether replace the paper resources an agent must rely on to obtain property information in a real-estate market.

It is another objective of the present invention to provide a data terminal equipped with management software which develops a digital guided tour of a particular area of a real-estate market.

It is another objective of the present invention to develop the guided tour by integrating a digital map with property information from a database which is either resident in the terminal or linked to the terminal through a communications network.

It is another objective of the present invention provide a data terminal of the aforementioned type which is portable, so that the terminal may be used by buyers and/or agents during a guided property tour.

It is another objective of the present invention to provide a data terminal of the aforementioned type which has a graphical user interface which allows a buyer to use the terminal without the assistance of an agent during a property tour, and which simultaneously provides the buyer with real-time property information derived from the MLS or other comparable database.

The foregoing and other objects of the invention are achieved by system and method for providing property information to buyers in real estate market place using digital technology. The system and method uses a tool in the form of a data terminal which stores management software that integrates a digital map with information derived, for example, from an MLS database. This information includes the location of properties in the market as well as other attributes. In addition to or in lieu of MLS information, the property information may include media data in the form of a digital image and/or movie clip, as well as other information which each real-estate agent may customize into the system.

In accordance with one embodiment of the invention, the data terminal is a stand-alone system which includes a map generation unit, a storage unit, a processor, and a display. The map generation unit generates a digital map of an area of interest designated by a user. Preferably, the map includes street address labels and/or other symbols of topological and man-made features in the coverage area. The storage unit stores property information derived from an MLS database, media information, and/or other customized information which may be considered important to a customer in purchasing, leasing, or renting property. The processor implements management software which integrates the property information with the digital map.

The integration of this information includes the display of icons which correspond to properties available in the map. Advantageously, the icons are selectable by the user. When selected, property information obtained from the storage unit is displayed in association with the map. The invention, thus, serves as a tool which guides buyers on a digital tour of properties in a market, while simultaneously providing real-time information for each of those properties.

Preferably, the data terminal is mobile in nature, taking the form of a notebook or laptop computer or even a personal digital assistant or so-called pocket PC. If mobile, the terminal of the invention may advantageously replace all the paper sources which real-estate agents traditionally used in assisting buyers in purchasing property. Also, when equipped with an easy-to-use graphical user interface, the terminal of the invention may be used by the buyer to develop his own guided tour, without the assistance of a real-estate agent. This saves time, relieves the buyer from "sales pressure" from the agent, and increases the overall efficiency of the home-buying experience. If desired, the terminal may be a desktop unit located in a real-estate agent's office.

In accordance with another embodiment of the invention, the data terminal communicates with one or more external sources of information. This embodiment is similar to the previous embodiment in that it includes a map generation unit, storage unit, processor, and display. In addition to these features, the terminal is equipped with a receiver for acquiring location data from an external positioning system, which may be satellite-based, cellular-based, or any other type capable of tracking the position of an object in an area of interest. Preferably, the receiver is a GPS receiver linked to the data terminal processor.

In operation, the location data receiver inputs position information into the processor, which then generates an icon corresponding to the position of the data terminal on the digital map. Advantageously, the processor updates the position of this icon as the terminal moves through the mapped region. If desired, the GPS receiver may be connected to the map generation unit, so that upon start-up the processor and map generation unit cooperate to automatically generate a digital map based on the location of the terminal. This is a particularly advantageous feature of the invention because a digital map of a market area with all the aforementioned icons may be generated without any input from the agent or agent buyer.

According to another aspect of the invention, the storage unit and/or processor may be connected to a remote data source through a communications link. The communication link may be established by a data-enabled mobile phone in the terminal or by another wireless communications device. The link may also be formed by a hard-wired connection, if desired. The remote data source may be a remote server connected to a website which contains MLS and/or other information. The server may also be a database in the real-estate agent's office which has been filled with MLS and non-MLS information customized to meet the agent's perceived needs of his buyers. The non-MLS information may include the media information (e.g., a digital image or movie clip) previously mentioned.

DESCRIPTION OF THE PREFERRED EMBODIMENTS

The present invention is a system and method which uses digital technology to acquire and then present in integrated form information relating to one or more properties in a real-estate market. The information may correspond to commercial or residential property which is offered for sale, lease, or rental in a particular area, and when equipped with appropriate interface software may be used by agents and/or buyers alike in pinpointing property that most likely will suit the buyers needs. The present invention is also a mobile data terminal which may be used as a tool by real-estate agents and buyers for displaying information of the aforementioned type.

Figure 1:
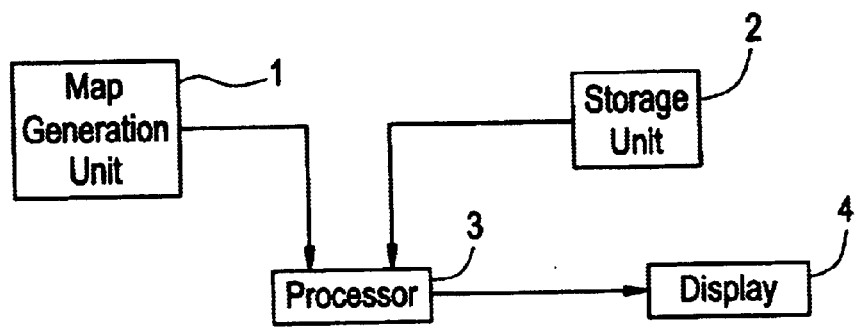
FIG. 1 is a diagram of a first embodiment of the system of the present invention which includes a stand-alone data terminal for locating property information in a real-estate market.

Referring to FIG. 1, a first embodiment of the system of the present invention includes a stand-alone data terminal for helping buyers and/or real-estate agents locate property information in a specific geographic area. The terminal is equipped with a map generation unit 1, a storage unit 2, a processor 3, and a display 4. Preferably, the terminal is mobile in nature, taking the form of a notebook or laptop computer, personal digital assistant, pocket-PC, web-enabled phone, or other portable device having at the very least a processor and memory. Alternatively, the terminal may be a desktop computer located, for example, in a real-estate broker's office, an agent's home, or in any of a variety of other fixed locations. In the case where the terminal is mobile, a real estate office may loan the terminal to buyers for use on their own time.

The map generation unit 1 generates a digital map for presentation on the display of the terminal. The digital map covers areas in a real-estate market which, for example, have been designated by a user using a keyboard or other input device. The areas cover one or more counties, cities, or towns in a state. If memory requirements permit, a map of an entire state or region of the country (e.g., the mid-Atlantic region) may be generated.

Preferably, the maps generated by unit 1 are detailed enough to show streets in at least a portion of the selected geographic area. Other features typically found on paper maps may also be shown, including but not limited to: topological features (e.g., bodies of water, mountains, etc.), parks, military installations, schools, amenities (e.g., shopping areas, food, lodging, etc.), recreational facilities (e.g., golf courses, swimming pools, community centers, etc.), subway and/or train routes, airports, government buildings, and zoning information. For convenience purposes, the streets and other features on the map may be labeled by one or more symbols or icons. Map generation units of this type are known by those skilled in the art and may include, for example, MapPoint offered by Microsoft or those disclosed in U.S. Pat. Nos. 5,844,570 and 5,884,216. A web-accessible map generation program which also may be used in accordance with the present invention goes under the name of MapQuest.®

The storage unit 2 stores information considered to be important by a real-estate agent and/or a buyer in searching for property to buy, lease, or rent. In this stand-alone embodiment, unit 2 preferably contains property information derived from the Multiple Listing Service (MLS). This information includes specific data on the properties available in a given market, including location (e.g., address, apartment number, lot number, etc.) data, price, amenities (e.g., deck, finished basement, hot tub, etc.), numbers and types of bathrooms, bedrooms, lot size, model type, status data such as whether the property is available, been sold, or is under contract, and MLS listing numbers which may be used for future reference or tracking purposes. Information identifying the real-estate broker and/or his or her contact information may also be included in the storage unit.

Other data not usually found in an MLS database may also be included in the storage unit. According to one particularly advantageous feature of the invention, one or more digital images (e.g., JPEG files) or movie clips (e.g., MPEG files) of properties in the market may be stored in the storage unit. This media information may be considered highly desirable in pinpointing properties which match buyer needs and desires. At the very least, the media information will allow buyers to eliminate properties from their search that might "sound good on paper," but which are undesirable in their appearance. Eliminating these properties expedite the home-buying process, thereby allowing the agent and buyer to concentrate their time on only those properties which have the highest likelihood of satisfying buyer requirements.

In terms of hardware, the storage unit of the present invention may be any type found in a data terminal or computing device. For example, if the terminal is a notebook computer, the storage unit may be a hard-drive, non-volatile memory, or even a removable storage medium such as a floppy disk or CD-ROM. If the terminal is a PDA, the storage unit may take the form of a flash memory. If desired, the storage unit of the present invention may include a combination of the aforementioned storage devices. Those skilled in the art can appreciate that the aforementioned types of devices are mentioned merely by way of example, and that if desired other conventional types of storage devices may be used.

The processor 3 may be any type capable of running a program or script for performing the information search, retrieval, and data integration functions of the invention. If the mobile terminal is a notebook computer, the processor may be a microprocessor running an application program which performs various management functions necessary for implementing the method of the present invention. These management functions include retrieving information from the map generation and storage units based on various data inputs and commands, as well as integrating this information for presentation on the display of the terminal.

Information retrieval is preferably guided by a search function of the management program. In accordance with the present invention, the search function is performed automatically in response to displayed icon selections, to be described in greater detail below, and/or other information input by a user. In this latter case, a user may input one or more characteristics of a property of interest into dedicated fields of a computer screen to initiate a search, e.g., a user may formulate a search statement which indicates a single-family home in the price range of $ 300,000–$ 350,000 having 4 full baths and a brick front. The management software may also control the manner in which information is modified, added, or deleted from the map generation and/or storage units of the invention. Also, where necessary, the program may allow units in the various embodiments of the invention to communicate with one another, in a manner that will become more apparent below.

The management program is preferably adapted to operate with a graphical user interface which allows for easy data entry and search functions. This interface may include, for example, one or more control screens with dedicated data fields for receiving user inputs. These fields advantageously allow users to customize searches for property meeting their specifications. The graphical user interface also organizes the presentation of information output from the map generation and storage units.

The display 4 may be any type conventionally known. For example, if the terminal is a mobile unit, the display may be a TFT-driven liquid crystal display. If the terminal is for desktop use, a standard CRT monitor or flat-panel display may be used. If the terminal is a PDA, a smaller LCD display is preferable.

Figure 2:
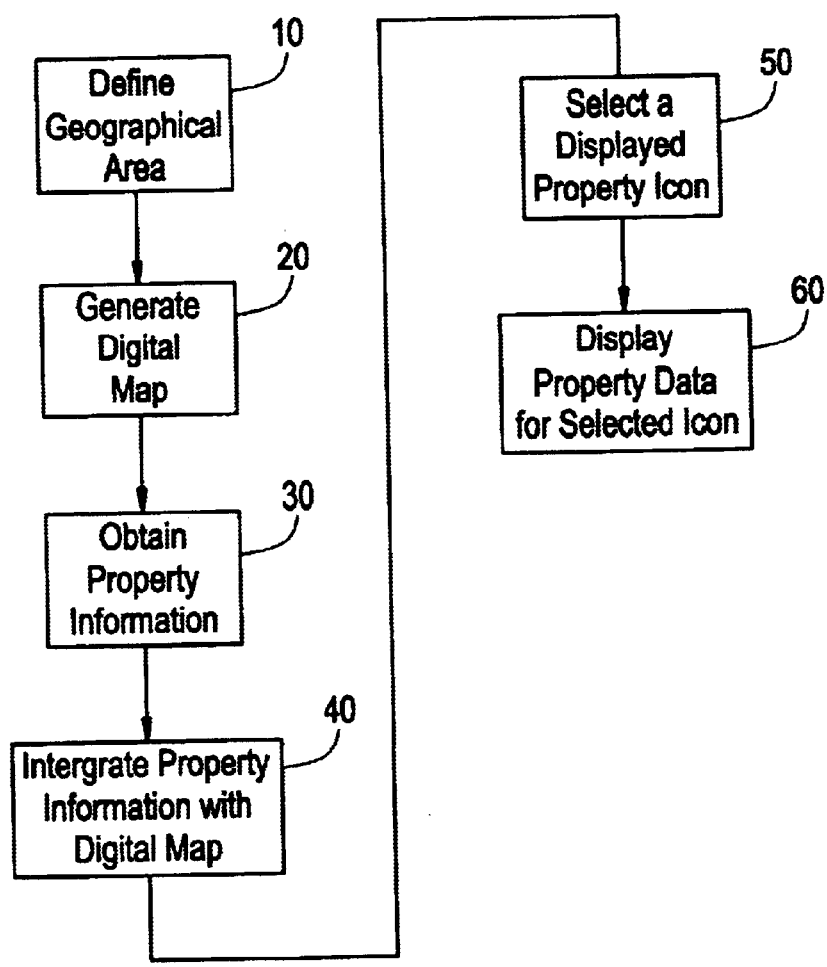
FIG. 2 is flow diagram showing steps included in a first embodiment of the method of the present invention for locating property information in a real-estate market.

FIG. 2 is a flow diagram showing steps included in a first embodiment of the method of the present invention, which may be implemented by the stand-alone system previously described. The method begins by having a real-estate agent or other user enter property information into the terminal which identifies a geographical area having one or more properties available on the market. (Block 10). The property information may be entered into one of the data fields previously mentioned, and may correspond to a city, town, or county or even a specific address.

In a second step, the property information is used as a basis for generating a digital map by the map generation unit. (Block 20). If the property information is a geographical area, the processor inputs this information directly into the map generation unit, which outputs an appropriate map in response. The digital map may cover all or part of the area specified according to one or more user-specified settings or a default setting. If a specific address is entered, the digital map may cover a predetermined radius centered on that address. Of course, as with many standard map generation programs the coverage area may be changed by the user. These keys may allow a user to zoom the map coverage area in or out, or may allow the map to skew in any desired direction (north, south, east, west).

In a third step, the processor searches the storage unit based on the property information entered by the user, and more specifically to generate a list of properties in the specified area and/or their accompanying attributes. (Block 30). This property information may be any of the types previously described, including MLS data, media information, and other customized information which may be considered important to a buyer in searching for a home, apartment, lot, etc.

In a fourth step, the processor associates the property information obtained from the third step with the digital map generated in the second step to form an integrated output on the display of the user's terminal. (Block 40). The integrated output is advantageously arranged in selected areas of a dedicated computer screen which forms all or part of the graphical user interface.

Figure 3:
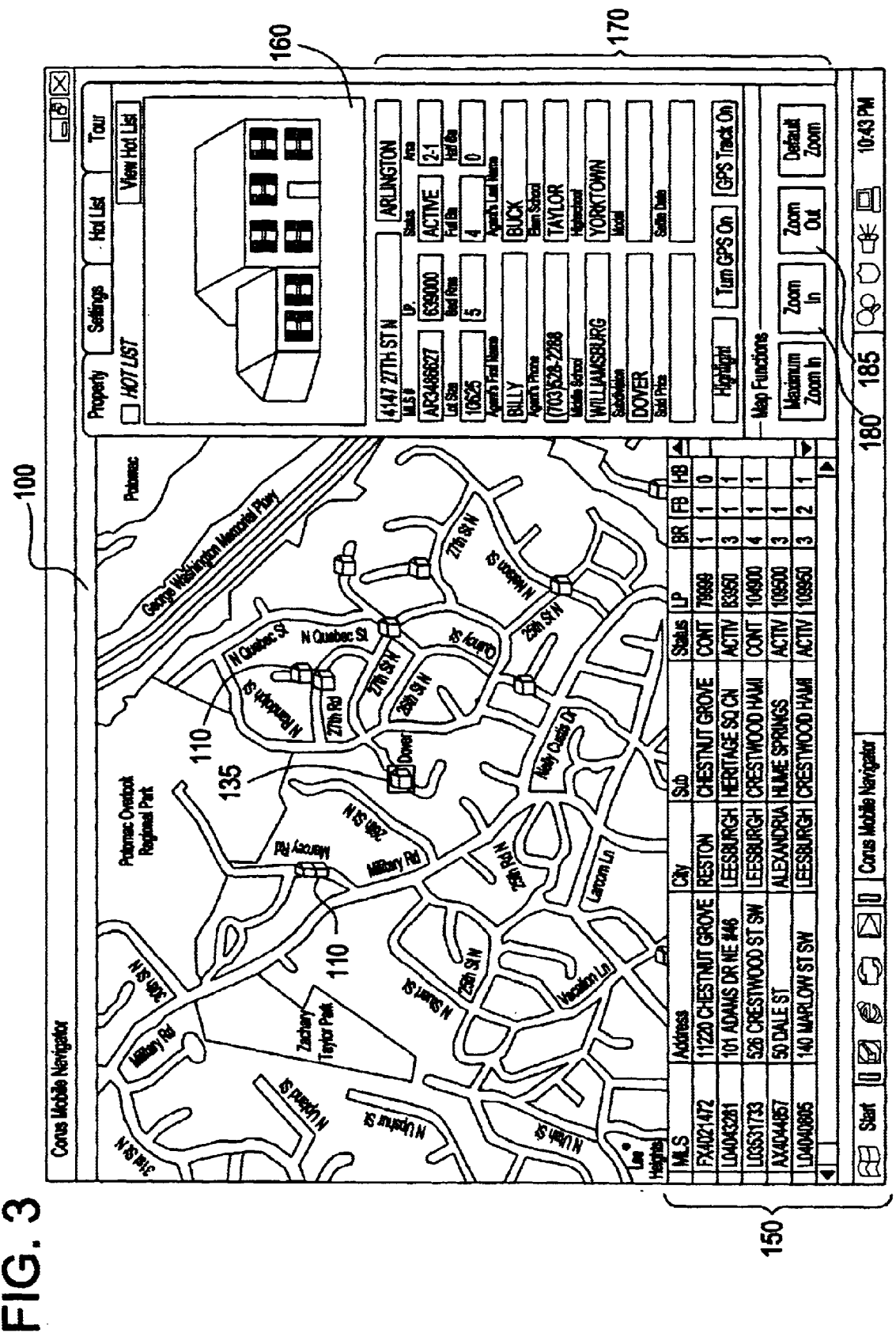
FIG. 3 is a diagram showing an example of a computer screen generated in accordance with the system and method of the present invention.

FIG. 3 shows an example of a computer screen generated by the processor which integrates the property information and digital map associated during the fourth step. This computer screen was generated as a result of a user entering location data designating the geographical area of Arlington, Va. Using this data, the map generation unit generated a map 100 covering this area. The processor then controlled the location on the computer screen where the map is to be displayed. The results of the storage unit search were then integrated with the map. In the particular example shown, the integration includes the overlaying of icons 110 on the map, where each icon represents the location of a property available in the region covered. The icons may be in the form of any symbol or mark. In accordance with a preferred embodiment of the invention, the icons resemble the type of property at that location, e.g., houses, apartment buildings, lots, etc. The display of icons on the digital map advantageously give a user a clear indication of the number and location of properties in the area.

The location of each icon on the map is derived, for example, from the MLS information produced from the storage unit as a result of the search. For example, in the area of Arlington shown, the processor search produced ten properties in the area covered by the map. The MLS information corresponding to these properties include addresses which are used by the processor to generate and then overlay the ten house symbols that appear on map 100. A textual listing of these properties with one or more attendant attributes were then displayed in a separate window 150 adjacent the map. This textual listing included information such as MLS number, street address, city, housing development name, market status (e.g., active, contract, sold, etc.), lot price and/or size, numbers of bedrooms, bathrooms, etc.

In a fifth step of the method, a user selects one of the displayed icons 135 using an input device such as a mouse, trackball, or touch pad. (Block 50). The selection of an icon causes additional information specific to the selected property to appear in window areas 160 and/or 170 of the display. (Block 60). In accordance with an especially advantageous feature of the invention, media information corresponding to the selected property is displayed in window 160. The media information may be any of those previously discussed including one or more digital images or even a movie clip. The digital image may show different views of the property, both inside and out. In FIG. 3, the front exterior of the property is shown. If desired, views of the backyard and/or selected areas inside the house may be displayed.

In window 170, textual information specific to the selected property is shown. This information includes, for example, agent, school, lot, and/or price information, all of which may or may not be derived from an MLS database. (At this point, it is important to note that information other than MLS information may be stored in the storage unit. For example, in addition to MLS information the terminal of the invention may store non-MLS information including the names of middle schools or high schools, history information such the age of the property, previous owner names, etc., and tax lien, zoning, and/or covenant information, just to name a few.)

In another step of the method, the user selects the other icons on the map. Each selection causes the processor to automatically output related media and/or textual information in windows 160 and 170.

In another step of the method, a user may expand or otherwise alter the search by expanding or reducing the coverage area of the map using, for example, the "Zoom In" and "Zoom Out" selection areas 180 and 185. The processor may be responsive to these zoom functions to automatically update the search for information in the storage unit. For example, if a user selects the Zoom Out button to obtain map showing a larger area surrounding the city of Arlington, the processor automatically searches the storage unit for properties which reside in that expanded area. Icons are then generated in those expanded area which the user can select to obtain additional information. The list in window 150 is also updated. If desired, instead of selecting icons, a user may directly selected one of the properties listed in window 150.

The system and method of the present invention as described above expedites the home-buying experience in a number of ways. For example, if the terminal of the present invention is mobile, an agent and home buyer may take the terminal with them in the car while driving in the area shown on the digital map. By selecting the various icons, the buyer may eliminate undesirable properties on the basis of the digital image and/or textual data displayed on the terminal, thereby expediting the process. If the buyer would like to consider properties in different geographical locations while out on a trip with an agent, he can do so simply by generating a digital map of those locations. This map may then be used as a convenient and accurate guide for reaching properties in those locations.

If the terminal of the present invention is at a fixed location such as in the agent's office, the invention may be used to allow the buyer to pre-screen properties before venturing out on a trip with the agent. This saves time and makes the search more efficient by targeting only those locations which likely will be most attractive to the buyer.

One variation to the method of the present invention contemplates directly entering information into one of the data fields in window 170. For example, if an agent or buyer knows the MLS number of a property in which he is interested, he may type this number into the MLS number window 190. In response to this information, the processor will automatically retrieve and display data from the storage unit which corresponds to this listing. The medial information in window 160 may then be displayed. Additionally, the processor may control the map generation unit to display a map covering a predetermined area surrounding the location of the listing. Like in the previous case, the map may include icons representing available property in the area displayed in the map. A similar set of steps may occur when, for example, price range and/or other information is input in the windows.

Another variation of the method of the present invention is performed in connection with an Internet website or other type of network link. Under these circumstances, the data terminal is equipped with a communications module for connecting to the network. If the data terminal is a mobile one, the communications module may be a data-enabled web phone. Otherwise, the module may be any known type of modem. In operation, after a user connects to the website, a password may be entered to gain access to the system. The user may then be presented with a screen which requests him to enter information which, for example, identifies a specific property or geographical area. Once the user enters this information, the website responds by generating a map including icons identifying property available in the coverage region as well as other information as discussed herein.

Figure 4:
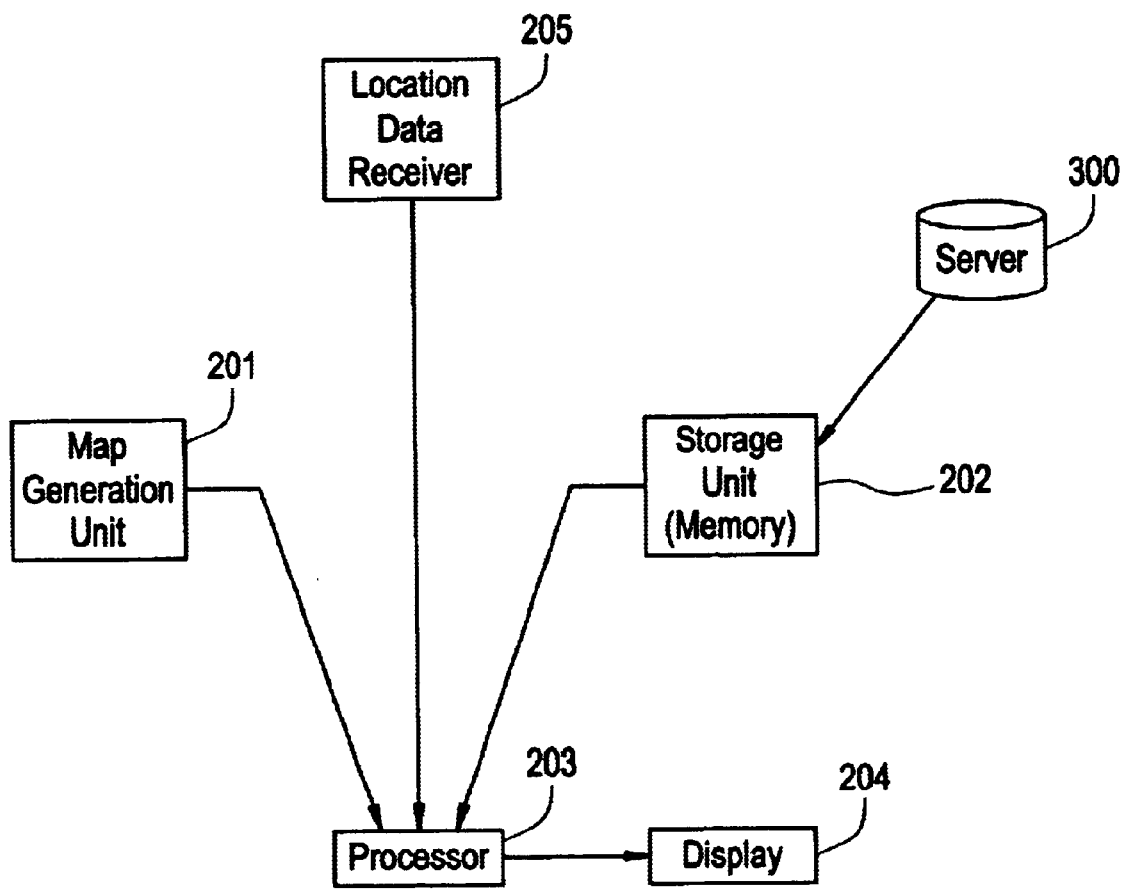
FIG. 4 is a diagram showing a second embodiment of the system of the present invention which includes a data terminal for locating property in a real-estate market, which data terminal may be mobile or stationary in nature.

Referring to FIG. 4, a second embodiment of the system of the present invention includes a terminal having a map generation unit 201, a storage unit 202, a processor 203, and a display 204. Unlike the first embodiment, this terminal is not a stand-alone system but rather is a mobile terminal connected to a location-positioning system via a communications link. The positioning system may be the Global Positioning System (GPS) or any of a variety of other positioning systems which use, for example, satellite data to determine location on a digital map. Accordingly, the terminal of the second embodiment includes a location data receiver 205 which may be a GPS receiver adapted to operate with a digital map. GPS receivers of this type are known to those skilled in the art. See, for example, U.S. Pat. Nos. 6,321,158 and 6,256,582.

Figure 5:
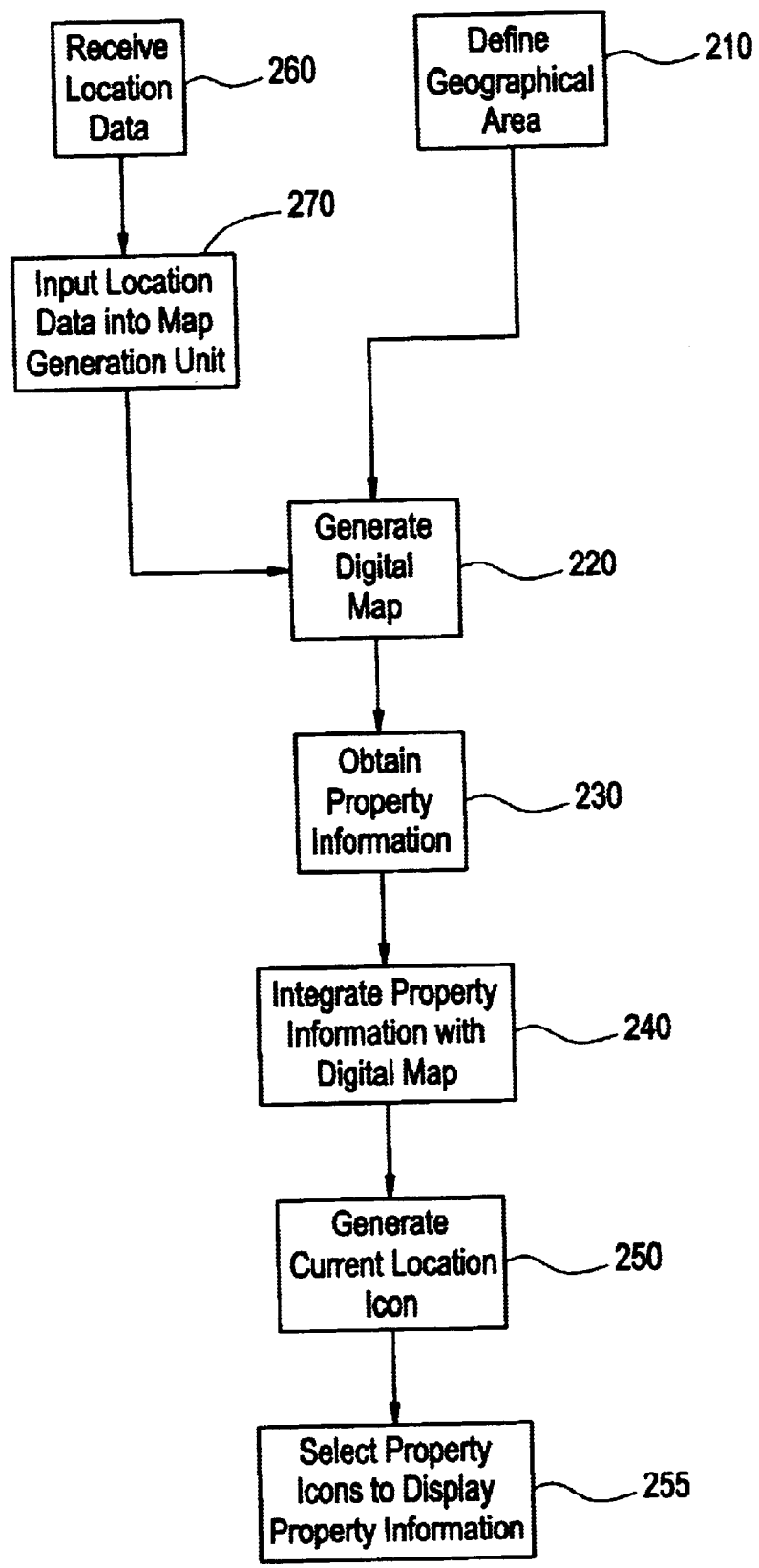
FIG. 5 is a flow diagram showing steps included in a second embodiment of the method of the present invention for locating property information in a real-estate market.

FIG. 5 is a flow diagram showing steps included in a second embodiment of the method of the present invention, which may be implemented by the system shown in FIG. 4. The method begins by having a real-estate agent or other user enter property information into the terminal which identifies a geographical area having one or more properties for available on the market. (Block 210). The property information may be entered into one of the data fields previously mentioned, and/or may correspond to a geographical area such as city, town, or county or even a specific address.

In a second step, the property information is used as a basis for generating a digital map by the map generation unit. (Block 220). The digital map may cover all or a portion of the area specified according to one or more user-specified settings or a default setting. If a specific address is entered, the digital map may cover a predetermined radius centered on that address. Of course, as with many standard map generation programs the coverage area may be changed by the user.

In a third step, the processor searches the storage unit based on the property information entered by the user, and more specifically to determine a list of available properties in the specified area and/or their accompanying attributes. (Block 230).

In a fourth step, the processor associates the information obtained from the third step with the digital map generated in the second step to form an integrated output on the display of the user's terminal. (Block 240). This results in the display of selectable icons on the digital map and/or textual information in window 170. The first through fourth steps may be performed in a manner analogous to those discussed with respect to the first embodiment.

Figure 6:
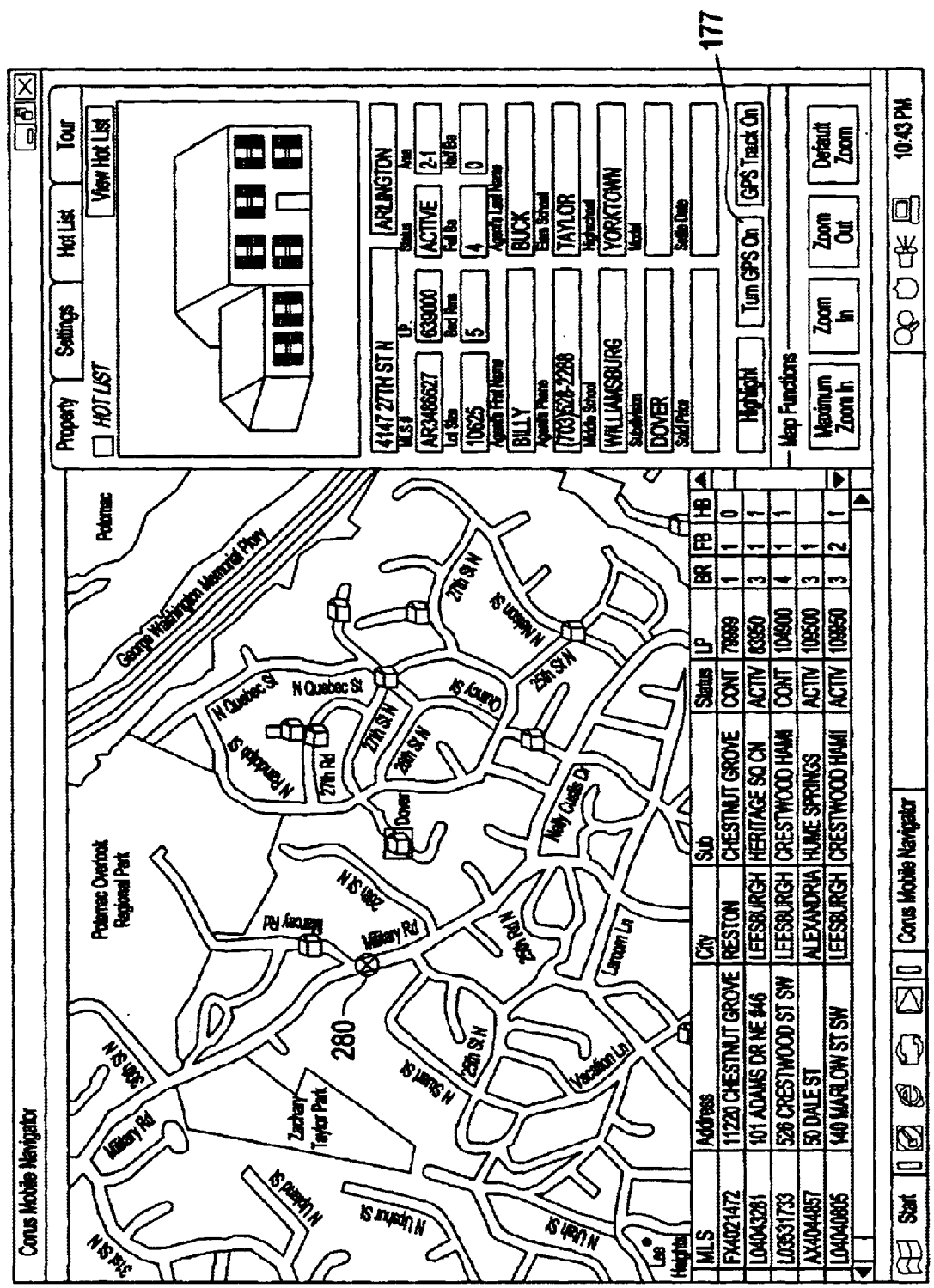
FIG. 6 is a diagram showing another example of a computer screen generated in accordance with the system and method of the present invention.

In a fifth step, the GPS receiver in the terminal receives location data from the GPS system. As shown in FIG. 6, receipt of this data may be initiated by the "Turn GPS On" selection window 177 in FIG. 3. This location data specifies a current position of the terminal, to within a small error. The GPS receiver inputs the location data into the processor, which then generates an icon 280 on the digital map indicating the current position of the terminal. (Block 250). Because the GPS receiver is a dynamic device, it continuously or at least periodically receives location data which updates the current location of the terminal as the terminal moves. The processor receives this data and causes the current-position icon 280 to move in a corresponding manner. As a result, a user can observe his location on the digital map relative to the locations of the properties identified by the selectable icons.

Subsequent steps of the method may be performed in a manner analogous to those in the first embodiment. These steps relate to: the selection of property icons and the subsequent display of specific property information associated with those icons, including media information in window 160 and textual information in window 170; the display of additional property icons when the map is zoomed in and out; as well as the other steps described with respect to the first embodiment.

As an alternative to the first and second steps, the second embodiment of the method of the present invention may begin with activation of the GPS receiver via selection area 208. (Block 260). This will cause the GPS receiver of the terminal to receive GPS data indicative of a current location of the terminal. This data is then forwarded to the processor, which then automatically activates the map generation unit to generate a map of an area surrounding the current location of the terminal, as determined by the received GPS data. (Block 270). Subsequent steps of the method may then proceed as described above.

In another variation of the second embodiment, the GPS receiver may be directly connected to the map generation unit. When location data is received from the receiver, the map generation unit may automatically respond by generating a map of a surrounding area on the display.

In another variation of the second embodiment, the terminal of the present invention is connected to a remote storage device. As shown in FIG. 4, this device 300 may be a remote server connected to a network such as the Internet, or a database located, for example, in a real-estate agent's office. In the former case, the remote server may be connected to an MLS website. In operation, when property information is input into the mobile terminal by a user the processor will automatically connect to the remote server. A search will then be performed of the MLS data at this website to obtain the information corresponding to a selected property icon. This data is then returned to the terminal for display.

If the remote device is a database in the agent's home office, the database may be loaded with MLS data on a periodic basis so that it is kept up to date. The database may also be furnished with media information and other types of non-MLS data as previously mentioned. When a search is initiated on the terminal, the processor may then acquire information from the database for display on the terminal. The connection between the mobile terminal and remote device may be any type of communications link known. Preferably, the connection is a wireless communications link which is operatively connected to a data modem installed in the mobile terminal. If desired, however, hard-wired connections may be used.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. A method of displaying current market information to prospective buyers about real-estate property in a geographical area of interest on a mobile computing device, comprising:

generating and displaying a digital map for viewing by said prospective buyer on said mobile computing device for said area of interest;

obtaining current status property information for an item of property in the real-estate market for the area of interest, wherein said property information is obtained from a database stored on said mobile computing device and includes at least a location, market price and a market status of the item of property;

displaying a property icon on said digital map at the location of the item of property, wherein the property icon is associated with the item of property in the real-estate market; and displaying, in response to the property icon being selected, at least the market price and the market status of the item of property associated with the selected property icon.

2. The method of claim 1, wherein said digital map shows at least one street within said area of interest.

3. The method of claim 2, wherein said step of displaying a property icon includes:

displaying said property icon on or adjacent to said street.

4. The method of claim 1, further comprising:

receiving location data indicative of a current location of the mobile computing device in said area of interest;

wherein said step of generating and displaying said digital map generates and displays a digital map for said area of interest based on the location data received in said receiving step.

5. The method of claim 1, further comprising:
receiving location data indicative of a current location of the mobile computing device in said area of interest; and
displaying, on said digital map, information indicative of the current location of said mobile computing device in said area of interest.

6. The method of claim 1, wherein the digital map is displayed in a first window on said mobile computing device, and wherein said property information includes a digital image of said item of property, and said digital image of said item of property is displayed in a second window in response to the property icon being selected.

7. The method of claim 1, wherein said database is derived from a database of MLS listings.

8. The method of claim 1, wherein said property information additionally includes at least one of demographics information related to said item of property, current owner information for said item of property, property specification information and real-estate broker information.

9. The method of claim 1, wherein said obtaining step includes obtaining property information which includes locations, market price and market status of a plurality of items of property in said area of interest, and wherein said displaying a property icon step includes displaying a property icon for each of said plurality of items of property with said digital map.

10. The method of claim 9, wherein the digital map with the plurality of property icons displayed on the map is displayed in a first window, property information of an item of property is displayed in a second window in response to the property icon associated with the item of property being selected in the first window, and textual information relating to each of the plurality of items of property is displayed in a third window.

11. The method of claim 10, wherein said second window includes at least one user-modifiable field, and wherein if a user enters information in said second window, the database is searched for items of property that match the user-entered information, and items of property that match the user-entered information are displayed in the third window.

12. The method of claim 11, wherein a user-modifiable field in the second window is market price range, and wherein if a user enters a price range in the market price range field, the database is searched for items of property whose market price is in the entered range, and items of property whose market price is in the entered price range are displayed in the third window.

13. The method of claim 1, wherein said market status information is selected from the group consisting of sold, available or under contract.

14. A real-estate market information mobile computing device, comprising:
a map generation unit for generating a digital map covering an area of interest;
a storage unit for storing property information which includes at least a location, a market price and a market status of an item of property in said area of interest;
a processor for determining information needed to display a property icon for the item of property at the location of the item of property on said digital map, and for determining information needed to display property information about the item of property associated with the property icon, in response to the property icon being selected, and
a display unit for displaying said generated digital map and the property icon, and for displaying the associated property information for the item of property when the associated property icon is selected.

15. The real-estate market information mobile computing device of claim 14, wherein said property information about the item of property displayed in response to the property icon associated with the item of property being selected includes at least one of a digital image of said item of property, demographics information related to said item of property, current owner information for said item of property, property specification information, market price information, and market status information.

16. The real-estate market information mobile computing device of claim 14, wherein said digital map shows at least one street within said area of interest.

17. The real-estate market information mobile computing device of claim 16, wherein said property icon is displayed on or adjacent to said street.

18. The real-estate market information mobile computing device of claim 14, further comprising:
a location determining unit which determines a current location of said mobile computing device, said location determining unit inputting information indicative of said current location to said map generation unit, said map generation unit automatically generating said digital map covering said area of interest based on said current location information.

19. The real-estate market information mobile computing device of claim 18, wherein said location determining unit is a GPS receiver.

20. The real-estate market information mobile computing device of claim 14, wherein said property information additionally includes a digital image of said item of property.

21. The real-estate market information mobile computing device of claim 14, wherein said property information additionally includes at least one of demographics information related to said item of property, current owner information for said item of property, property specification information, and real-estate broker information.

22. The real-estate market information mobile computing device of claim 14, wherein said property information stored in the storage unit is comprised of a database of one or more MLS listings.

23. The real-estate market information mobile computing device of claim 14, wherein said storage unit stores MLS listing information, wherein the location of said item of property is included within said MLS listing information.

24. The real-estate market information mobile computing device of claim 14, wherein said market status information is selected from the group consisting of sold, available or under contract.

25. The real-estate market information mobile computing device of claim 14, wherein said display unit displays the generated digital map with the property icon in a first window, and wherein said property information includes a digital image of the item of property, and said digital image of said item of property is displayed in a second window in response to the property icon being selected.

26. The real-estate market information mobile computing device of claim 14, wherein stored property information includes locations of a plurality of items of property in said area of interest, and wherein said processor determines information needed to display a plurality of selectable icons corresponding to locations of each of the plurality of items of property, respectively, said locations included within said property information stored in said storage unit.

27. The real-estate market information mobile computing device of claim 26, wherein said display unit displays the digital map with the plurality of property icons displayed on the map in a first window, property information of an item of property in a second window in response to the property icon associated with the item of property being selected in the first window, and textual information relating to each of the plurality of items of property in a third window.

28. The real-estate market information mobile computing device of claim 27, wherein said second window includes at least one user-modifiable field, and wherein if a user enters information in said second window, the processor searches a database stored in the storage unit for items of property that match the user-entered information, and the display unit displays items of property that match the user-entered information in the third window.

29. The real-estate market information mobile computing device of claim 28, wherein a user-modifiable field in the second window is market price range, and wherein if a user enters a price range in the market price range field, the processor searches the database for items of property whose market price is in the entered range, and the display unit displays items of property whose market price is in the entered price range in the third window.

30. A computer-readable medium storing a program to be implemented in a processing unit of a mobile computing device, said computer-readable medium including:

a first code section for controlling a display of a digital map covering an area of interest on the mobile computing device;

a second code section for obtaining property information which includes at least a location, a market price and a market status of one an item of property in said area of interest, wherein said property information is stored in a database on the mobile computing device;

a third code section for displaying a property icon at the location of the item of property on said digital map, wherein the property icon is associated with the item of property; and a fourth code section for displaying, in response to the property icon being selected, at least the market price and the market status of the item of property associated with the selected property icon.

31. The computer-readable medium of claim 30, said method computer-readable medium further comprising:

a fifth code section for additionally displaying, in response to said selection, at least one of a digital image of said item of property, demographics information related to said item of property, current owner information for said item of property, property specification information and real-estate broker information.

32. The computer-readable medium of claim 30, further comprising:

a sixth code section for receiving location data indicative of a current location of the mobile computing device in said area of interest; and a seventh code section for automatically generating said digital map based on the current location data received in said sixth code section.

33. The computer-readable medium of claim 30, further comprising:

a sixth code section for receiving location data indicative of a current location of the mobile computing device in said area of interest; and a eighth code section for displaying, on said digital map, information indicative of the current location of said mobile computing device in said area of interest.

\* \* \* \* \*

(12) EX PARTE REEXAMINATION CERTIFICATE (10479th)
United States Patent
Hartz, Jr. et al.

(10) Number: US 6,636,803 C1
(45) Certificate Issued: Jan. 21, 2015

(54) REAL-ESTATE INFORMATION SEARCH AND RETRIEVAL SYSTEM

(75) Inventors: Daniel K. Hartz, Jr., Fairfax, VA (US); Michael T. Gorman, Arlington, VA (US); Eric Rossum, Annandale, VA (US); Richard Barney, Gaithersburg, MD (US)

(73) Assignee: Corus Realty, LLC, McLean, VA (US)

Reexamination Request:
No. 90/012,958, Aug. 27, 2013

Reexamination Certificate for:
Patent No.: 6,636,803
Issued: Oct. 21, 2003
Appl. No.: 09/996,744
Filed: Nov. 30, 2001

(51) Int. Cl.
*G06Q 10/00* (2012.01)

(52) U.S. Cl.
USPC .......................... 701/459; 701/454; 705/313

(58) Field of Classification Search
None
See application file for complete search history.

(56) References Cited

To view the complete listing of prior art documents cited during the proceeding for Reexamination Control Number 90/012,958, please refer to the USPTO's public Patent Application Information Retrieval (PAIR) system under the Display References tab.

*Primary Examiner* — Deandra Hughes

(57) ABSTRACT

A search and retrieval system includes a data terminal which displays icons representing properties in a given real-estate market on a digital map. The icons are selectable so that, when selected, information derived from an MLS or other database are displayed in association with the map. In one embodiment, the data terminal is equipped with a GPS receiver and data-enabled mobile phone. The GPS receiver receives location data which is used by a processor to display an icon representing a current location of the terminal within the map. The data-enabled phone links the terminal to a remote server or database of property information, which may also be displayed when property icons are selected on the map. The property information may include media (e.g., bitmap) data that provide a visual depiction of the property icons selected. By integrating all of these digital sources of information on one terminal, the efficiency and accuracy of the property buying experience is significantly enhanced.

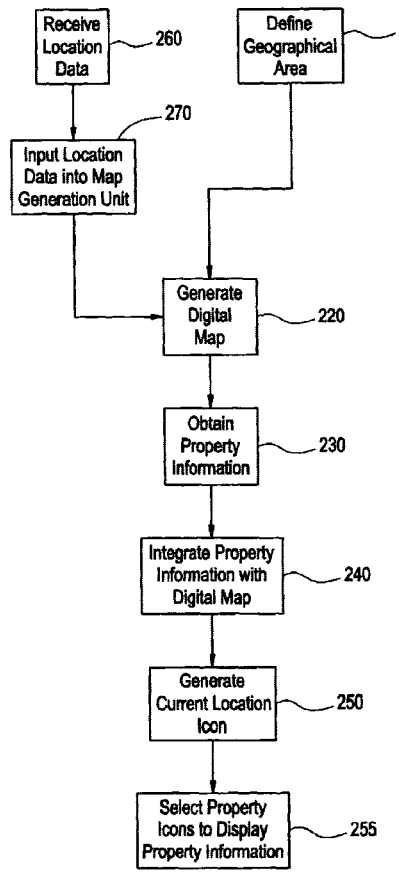

US 6,636,803 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 7 and 32 are cancelled.

Claims 1, 3-6, 8, 10-31 and 33 are determined to be patentable as amended.

Claims 2 and 9, dependent on an amended claim, are determined to be patentable.

New claims 34-38 are added and determined to be patentable.

1. A method of *generating and* displaying *a digital map of* current market information to prospective buyers about *residential* real-estate property in a geographical area of interest on a [mobile computing device] *data-enabled mobile phone configured to obtain cellular-based location data*, comprising:
   obtaining *said area of interest from the cellular-based location data;*
   generating and displaying [a]*the* digital map for viewing by said prospective buyer on said [mobile computing device] *data-enabled mobile phone* for said area of interest; obtaining current status property information for an item of property in the *residential* real-estate market for the area of interest, wherein said property information is obtained from *a remote data source and* a database stored on said [mobile computing device and] *data-enabled mobile phone, wherein the current status property information* includes [at least] *multiple listing service (MLS) data comprising* a location, *a* market price and a market status of the item of property;
   displaying a property icon on said digital map at the location of the item of property, wherein the property icon [is associated with] *refers to* the item of property in the *residential* real-estate market; and
   displaying, [in response to] *upon selection of* the property icon[being selected], [at least] *MLS data including* the market price and the market status of the item of property [associated with] *of* the selected property icon.

3. The method of claim 2, wherein said step of displaying a property icon includes:
   displaying said property icon on or [adjacent to] *abutting* said street.

4. The method of claim 1, further comprising:
   receiving location data [indicative] of a current location of the [mobile computing device] *data-enabled mobile phone* in said area of interest;
   wherein said step of generating and displaying said digital map generates and displays a digital map for said area of interest [based on] *from* the location data received in said receiving step.

5. The method of claim 1, further comprising:
   receiving location data [indicative] of a current location of the [mobile computing device] *data-enabled mobile phone* in said area of interest; and
   displaying, on said digital map, [information indicative] *a position icon* of the current location of said [mobile computing device] *data-enabled mobile phone* in said area of interest.

6. The method of claim 1, wherein the digital map is displayed in a first window on said [mobile computing device] *data-enabled mobile phone*, and wherein said property information includes a digital image of said item of property, and said digital image of said item of property is displayed in a second window [in response to] *upon selection of* the property icon[being selected].

8. The method of claim 1, wherein said property information additionally includes at least one of demographics information [related to] *for* said item of property, current owner information for said item of property, property specification information and real-estate broker information.

10. The method of claim 9, wherein the digital map with the plurality of property icons displayed on the map is displayed in a first window, property information of an item of property is displayed in a second window [in response to] *upon selection of* the property icon [associated with] *of* the item of property [being selected] in the first window, and textual information [relating to]*for* each of the plurality of items of property is displayed in a third window.

11. The method of claim 10, wherein said second window includes [at least] one *or more* user-modifiable field, and wherein if a user enters information in said second window, the database is searched for items of property *having property information* that [match] *matches* the user-entered information, and items of property *having property information* that [match] *matches* the user-entered information are displayed in [the third] *a fourth* window.

12. The method of claim 11, wherein a user-modifiable field in the second window is market price range, and wherein if a user enters a price range in the market price range field, the database is searched for items of property whose market price is in the entered range, and items of property whose market price is in the entered price range are displayed in [the third] *a fourth* window.

13. The method of claim 1, wherein said market status information is selected from the group consisting of sold, available[or ], *and* under contract.

14. A *residential* real-estate market information mobile computing device, comprising:
   *a cellular-based data receiver configured to obtain cellular-based location data;*
   a map generation unit for generating a digital map covering an area of interest, *wherein said area of interest is obtained from the cellular-based location data*;
   a storage unit for storing property information which includes [at least] *multiple listing service (MLS) data comprising* a location, a market price and a market status of an item of property in said area of interest;
   a processor for determining information needed to display a property icon for the item of property at the location of the item of property on said digital map, and for determining information needed to display property information about the item of property [associated with] *of* the property icon[, in response to] *upon selection of* the property icon [being selected], and
   a display unit for displaying said generated digital map and the property icon, and for displaying the [associated] property information for the item of property [when the associated] *upon selection of the* property icon [is selected], *wherein the property information comprises MLS data including the market price and the market status of the item of property.*

15. The *residential* real-estate market information mobile computing device of claim 14, wherein said property information about the item of property displayed in [response to] *upon selection of* the property icon [associated with] *of* the item of property [being selected] includes at least one of a digital image of said item of property, demographics information related to said item of property, current owner information for said item of property, property specification information, market price information, and market status information.

16. The *residential* real-estate market information mobile computing device of claim 14, wherein said digital map shows at least one street within said area of interest.

17. The *residential* real-estate market information mobile computing device of claim 16, wherein said property icon is displayed on or [adjacent to] *abutting* said street.

18. The *residential* real-estate market information mobile computing device of claim 14 [, further comprising:
    a location determining unit which determines a current location of said mobile computing device, said location determining unit inputting information indicative of said current location to said map generation unit, said map generation unit automatically generating said digital map covering said area of interest based on said current location information], *wherein said area of interest is from the location data received from the cellular-based location data receiver.*

19. The *residential* real-estate market information mobile computing device of claim 18, wherein said location determining unit [is]*further comprises* a GPS receiver.

20. The *residential* real-estate market information mobile computing device of claim 14, wherein said property information additionally includes a digital image of said item of property.

21. The *residential* real-estate market information mobile computing device of claim 14, wherein said property information additionally includes at least one of demographics information [related to] *of* said item of property, current owner information for said item of property, property specification information, and real-estate broker information.

22. The *residential* real-estate market information mobile computing device of claim 14, wherein said property information stored in the storage unit is comprised of a database of one or more MLS listings.

23. The *residential* real-estate market information mobile computing device of claim 14, wherein said storage unit stores MLS listing information, wherein the location of said item of property is included within said MLS listing information.

24. The *residential* real-estate market information mobile computing device of claim 14, wherein said market status information is selected from the group consisting of sold, available[or], *and* under contract.

25. The *residential* real-estate market information mobile computing device of claim 14, wherein said display unit displays the generated digital map with the property icon in a first window, and wherein said property information includes a digital image of the item of property, and said digital image of said item of property is displayed in a second window [in response to] *upon selection of* the property icon [being selected].

26. The *residential* real-estate market information mobile computing device of claim 14, wherein stored property information includes locations of a plurality of items of property in said area of interest, and wherein said processor determines information needed to display a plurality of selectable icons corresponding to locations of each of the plurality of items of property, respectively, said locations included within said property information stored in said storage unit.

27. The *residential* real-estate market information mobile computing device of claim 26, wherein the display unit displays the digital map with the plurality of property icons displayed on the map in a first window, property information of an item of property in a second window [in response to] *upon selection of* the property icon [associated with] *of* the item of property being selected in the first window, and textual information [relating to] *for* each of the plurality of items of property in a third window.

28. The *residential* real-estate market information mobile computing device of claim 27, wherein said second window includes at least one user-modifiable field, and wherein if a user enters information in said second window, the processor searches a database stored in the storage unit for items of property *having property information* that [match] *matches* the user-entered information, and the display unit displays items of property *having property information* that [match] *matches* the user-entered information [are displayed in the third] in a fourth window.

29. The *residential* real-estate market information mobile computing device of claim 28, wherein a user-modifiable field in the second window is market price range, and wherein if a user enters a price range in the market price range field, the processor searches the database for items of property whose market price is in the entered range, and the display unit displays items of property whose market price is in the entered price range in the [third] *fourth* window.

30. A *non-transitory* computer-readable medium storing a program to be implemented in a processing unit of a mobile computing device, said computer-readable medium including:
    a first code section for controlling a display of a digital map covering an area of interest on the mobile computing device;
    a second code section for obtaining *residential* property information which includes [at least] *multiple listing service (MLS) data comprising* a location, a market price and a market status of [one] *an* item of property in said area of interest, wherein said property information is *obtained from a remote data source and* stored in a database on the mobile computing device;
    a third code section for displaying a property icon at the location of the item of property on said digital map, wherein the property icon [is associated with] *refers to* the item of property; [and]
    a fourth code section for displaying [, in response to] *upon selection of* the property icon [being selected, at least] *MLS data including* the market price and the market status of the item of property [associated with] *of* the selected property icon;
    *a fifth code section for receiving cellular-based location data of a current location of the mobile computing device in said area of interest; and*
    *a sixth code section for generating said digital map from the current location data received in said sixth code section.*

31. The computer-readable medium of claim 30, said [method] computer-readable medium further comprising:
    a [fifth] *seventh* code section for additionally displaying[, in response to said] *upon* selection [,] *of the property icon* at least one of a digital image of said item of property, demographics information [related to] *of* said item of property, current owner information for said item of property, property specification information and real-estate broker information.

33. The computer-readable medium of claim 30, further comprising:
   a [sixth] *seventh* code section for receiving location data [indicative] of a current location of the mobile computing device in said area of interest; and
   [a] *an* eighth code section for displaying, on said digital map, [information indicative of] the current location of said mobile computing device in said area of interest.

*34. The method of claim 1, further comprising expanding the coverage area of the map using a zoom feature to obtain a second area of interest;*
   *obtaining current status property information for an item of property in the residential real-estate market for the second area of interest; and*
   *displaying a second property icon on said digital map at the location of the item of property within the second area of interest.*

*35. The method of claim 1, further comprising obtaining a second area of interest that is user-generated;*
   *obtaining current status property information for an item of property in the residential real-estate market for the second area of interest; and*
   *displaying a second property icon on said digital map at the location of the item of property within the second area of interest.*

*36. The method of claim 1, wherein the MLS data further comprises an MLS listing number.*

*37. The residential real-estate market information mobile computing device of claim 14, wherein the MLS data further comprises an MLS listing number.*

*38. The computer-readable medium of claim 30, wherein the MLS data further comprises an MLS listing number.*

\* \* \* \* \*